United States Patent [19]

Lewis et al.

[11] 4,379,295
[45] Apr. 5, 1983

[54] LOW SIDELOBE PULSE COMPRESSOR

[75] Inventors: Bernard L. Lewis, Oxon Hill; Frank F. Kretschmer, Laurel, both of Md.

[73] Assignee: The United States of America as represented by the Secretary of the Navy, Washington, D.C.

[21] Appl. No.: 230,984

[22] Filed: Feb. 3, 1981

[51] Int. Cl.³ .............................................. G01S 13/28
[52] U.S. Cl. ........................ 343/17.2 PC; 343/5 FT; 343/5 NQ
[58] Field of Search ...................... 343/17.2 PC, 5 FT

[56] References Cited

U.S. PATENT DOCUMENTS 3,680,105 7/1972 Goldstone ................... 343/17.2 PC
3,987,285 10/1976 Perry ........................ 343/17.2 PC X
4,003,054 1/1977 Goldstone ............... 343/17.2 PC X
4,237,461 12/1980 Cantrell et al. ......... 343/17.2 PC X Primary Examiner—T. H. Tubbesing
Attorney, Agent, or Firm—Robert F. Beers; William T. Ellis

[57] ABSTRACT

A pulse compression system based on the transmission of a step approximation to linear FM pulse, and the subsequent processing of echos therefrom by converting the echo pulses to I and Q baseband signals and then sampling these I and Q signals at the Nyquist sampling rate. It has been discovered that this processing yields a signal with a spectrum substantially identical to the spectrum of a properly sampled Frank coded pulse. These sampled I and Q signals are then compressed by a Fast Fourier Transform compressor to yield a pulse with low sidelobes.

6 Claims, 5 Drawing Figures

LOW SIDELOBE PULSE COMPRESSOR

BACKGROUND OF THE INVENTION

This invention relates generally to radar processing systems, and more particularly to pulse compression systems yielding low range-time sidelobes.

It is well known in the art of pulse radar systems that in order to obtain a good detection capability against a background of noise, a pulse with a large energy content must be transmitted. This large energy content may be obtained by either transmitting a pulse with a large peak power and/or with a long pulse duration. If the pulse width is limited to small values because of the desire to obtain good range accuracy or resolution, the required energy pulse must be obtained with a large peak power. However, in many applications it is not possible to obtain a peak power as large as one might desire because of voltage-peak limitations somewhere in the system. In such peak-power-limited radar systems, the required energy can be obtained only by transmitting a longer pulse. In order to retain radar range resolution when transmitting a long pulse with a high average power content, pulse compression techniques are employed. The use of such pulse compression techniques permit the transmitted pulse to be made as long as desired while retaining an optimum range resolution. In the pulse compression process, a long coded pulse with a band-width B much greater than the reciprocal of the pulse length is transmitted and echo returns therefrom are decoded to form short pulses with durations equal to 1/B. The codes employed can be either phase codes or frequency codes. The phase codes are generated by transmitting a phase for a time interval 1/B, changing the phase for the next time interval 1/B, etc. It has been found that the use of the Frank phase code (R. L. Frank, "Polyphase Codes With Good Nonperiodic Correlation Properties," IEEE Trans. IT-9,43–45, Jan. 1963) is especially advantageous because it has excellent doppler tolerance and very low range-time sidelobes (the highest sidelobe is approximately $p\pi^2$ down from the mainlobe, where p is the pulse compression ratio). These low sidelobes are achieved without amplitude weighting, as required in many other types of codes. The low range-time sidelobes are especially important in order to minimize the radar output when a echo return is not properly indexed in the radar compressor. The decoding of a Frank coded transmission may be accomplished by means of a Fast Fourier Transform circuit thereby reducing the number of processing elements from $N^2$ to $N \log_2 N$. Thus, the ability to use Fast Fourier Transform processing yields a significant cost reduction in the system. See U.S. Pat. No. 4,237,461 B. H. Cantrell and B. L. Lewis for a "High-Speed Digital Pulse Compressor." However, the abrupt 0 to $\pi$ phase shifts normally used to implement the sharp steps in the Frank code require a transmitter, receiver, and processing circuitry with a very broad band frequency characteristic. Such broad band systems with bandwidths significantly larger than the reciprocal of the compressed pulse duration allow in a significant amount of out-of-band thermal noise which will fold-over when the signal is sampled at the Nyquist rate for conversion to I and Q digital words. This noise fold-over seriously degrades the signal-to noise ratio of the radar thereby reducing target detectability. Such broad bandwidth systems are also expensive. Thus, it is generally desired to match the receiver bandwidth and the subsequent I.F. amplifying circuits to a bandwidth on the order of the reciprocal of the compressed pulse duration. However, if the receiver and/or processing circuitry bandwidth is not wide, then the abrupt phase changes in the phase modulation result in amplitude modulation which causes the properly indexed output and the sidelobes to vary drastically with target range in cycles of length C/2B (the sampling rate), where C is the velocity of light. This amplitude modulation is due to the fact that the period of time required for a circuit such as an I.F. amplifier to build up to a given amplitude is inversely proportional to the bandwidth of the circuit. A 0 to $\pi$ phase shift requires the signal amplitude of the amplifier to go to zero and then to build up to the same signal amplitude but with a $\pi$ phase. Thus, when abrupt phase changes of $\pi$ radians occur in a code, as they do in the midsection of the Frank code, the band limited receiver and/or I.F. processing circuitry must de-ring and re-ring with the amplitude of the response going through zero with a non-infinite slope. If the system samples during this 0 to $\pi$ phase change, the sampled signal could have any value from zero to the proper signal amplitude.

The spectrum of a decoded pulse in Frank code generally takes the form of a (sin x)/x curve in a wideband system. The use of a restricted bandwidth receiving system limits this usable bandwidth to a portion 3 dB down on either side of the mainlobe as shown in FIG. 1. In essence, because of the finite time required for the narrow bandwidth system to respond to abrupt signal changes, the signal amplitude tends to be averaged or spread across a series of coutiguous range cells. Thus, the sidelobes are significantly increased with respect to the mainlobe. Such a sidelobe-to-mainlobe ratio allows the sidelobes of a large or close-in target to mask the mainlobe from smaller or more distant targets.

Accordingly, in view of the wide band requirements of the Frank code, it is difficult to implement in an economical fashion. However, the Fast Fourier Transform processing utilized with the Frank code is very desirable because its use significantly reduces the hardware requirements of the system.

OBJECTS OF THE INVENTION

Accordingly, it is an object of the present invention to provide a pulse compression system wherein the echo returns are processed in a narrow band system and are then compressed using a Fast Fourier Transform circuit.

It is a further object of the present invention to provide a pulse compression system utilizing Fast Fourier Transform matched filter processing for use with frequency codes.

It is yet a further object of the present invention to provide a pulse compression system with low range-time sidelobes, simplicity of circuitry, and with a receiver bandwidth equal to the reciprocal of the compressed pulse length.

Other objects, advantages, and novel features of the present invention will become apparent from the detailed description of the invention, which follows the summary.

SUMMARY OF THE INVENTION

Briefly, the pulse compression system of the present invention comprises a signal generator for generating a step approximation to a linear FM signal with N frequency steps, a transmitter circuit for transmitting this stepped signal, a receiving circuit for receiving echoes from the transmitted signal, a converting circuit for converting the received echo to a baseband signal and including a narrow band filter therein, an analog-to-digital converter for digitizing the baseband signal at the Nyquist sampling rate for the baseband, a Fast Fourier Transform circuit for weighting discrete sets of N digitized samples from the A/D converter and generating $N^2$ weighted outputs therefrom representing the passbands for the N transmitted frequency steps, a differential delay circuit for differentially delaying the N passband outputs such that the passband outputs occur simultaneously, and an adding circuit for adding the differentially delayed output to form a single pulse such that when an echo is properly indexed within a discrete set of $N^2$ time delay taps, then a short pulse is generated with a peak amplitude and low sidelobes.

DETAILED DESCRIPTION OF THE INVENTION

Applicants have discovered that the conversion of a step-approximation to linear FM echo pulse to I and Q baseband signals and then sampling the converted I and Q signals at the Nyquist rate yields a signal with a spectrum substantially identical to the spectrum of a properly sample Frank coded pulse. As a consequence, applicants have discovered that the sampled I and Q signals from a step-approximation to linear FM echo signal can be compressed in the same manner as the Frank code. In particular, this stepped signal can be compressed utilizing the Fast Fourier Transform compressor disclosed in the aforementioned U.S. Pat. No. 4,237,461 which is hereby incorporated by reference into this specification.

The discovery that the step-approximation to linear FM coding can be substituted for Frank coding before sampling is especially advantageous because it allows the system designer to take advantage of the narrower, rectangular type spectrum of the stepped FM pulse with its attendant narrow band processing in conjunction with the use of Fast Fourier Transform processing to significantly simplify and reduce the cost of the compression circuitry.

With regard to the step-approximation to linear FM pulse, it has a frequency spectrum composed of N contiguous (sin x)/x spectrums, one for each frequency step with peak to first null frequency separations equal to the reciprocal of the time that such frequency step is transmitted.

For purposes of comparison of the stepped FM pulse to the Frank code, assume for convenience that the desired pulse compression ratio p (determined by the amount that the average power is to be increased over the peak power) is 16, thus making $N^2=16$ or $N=4$. A Frank code implementation having a pulse compression ratio p of 16 would require 16 code elements with each element having a (sin x)/x spectrum with the first null at $N^2/T$ or 16/T where T is the code element duration. On the other hand, a stepped linear FM pulse implementation having a pulse compression ratio p of 16 would require $N=4$ frequency steps, each frequency step having a (sin x)/x spectrum, with the first null at N/T or 4/T in this case. Thus, each frequency step lasts N or 4 times longer than each code element in the Frank code. Accordingly, each frequency step has a spectrum which is 4 times narrower that the spectrum for the individual Frank code elements.

Figure 2:
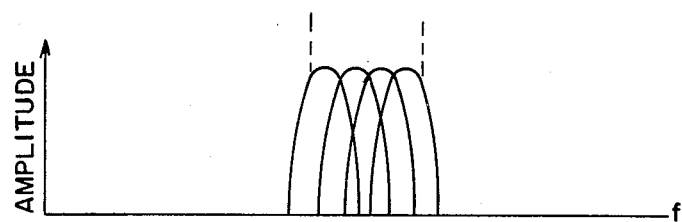
FIG. 2 is a graphical representation of the transmitted spectrum of a step-approximation to linear FM pulse.

FIG. 2 shows the spectrum for a stepped linear FM pulse having an N equal to 4. After sampling, the spectrum of the stepped FM pulse takes the form of a (sin x)/x curve. However, the nulls in this spectrum are separated by the sampling rate. Thus, the entire mainlobe of the spectrum response is passed through. In contradistinction, only the mainlobe of the spectrum down to the 3 dB points is passed for the Frank code. Thus, it can be seen that the stepped FM pulse maintains more energy in the passband of the system than the Frank code. Accordingly, the stepped linear FM transmission can be processed with equipment having a bandwidth restricted to the reciprocal of the compressed pulse duration without significant loss of signal resolution.

Basically, the present invention is implemented by using an analog type step approximation to linear FM transmission pulse, processing the echo from this pulse by means of a narrow band system utilizing baseband sampling at the Nyquist rate, and then compressing this sample signal by means of a Fast Fourier Transform circuit. Thus, this invention combines the advantages of the narrow band processing attendant to the use of a step approximation to linear FM pulse, the low sidelobe advantages attendant to the use of digital processing, and the advantage of simplified circuitry attendant to the use of a Fast Fourier Transform circuit as the compressor.

Figure 3:
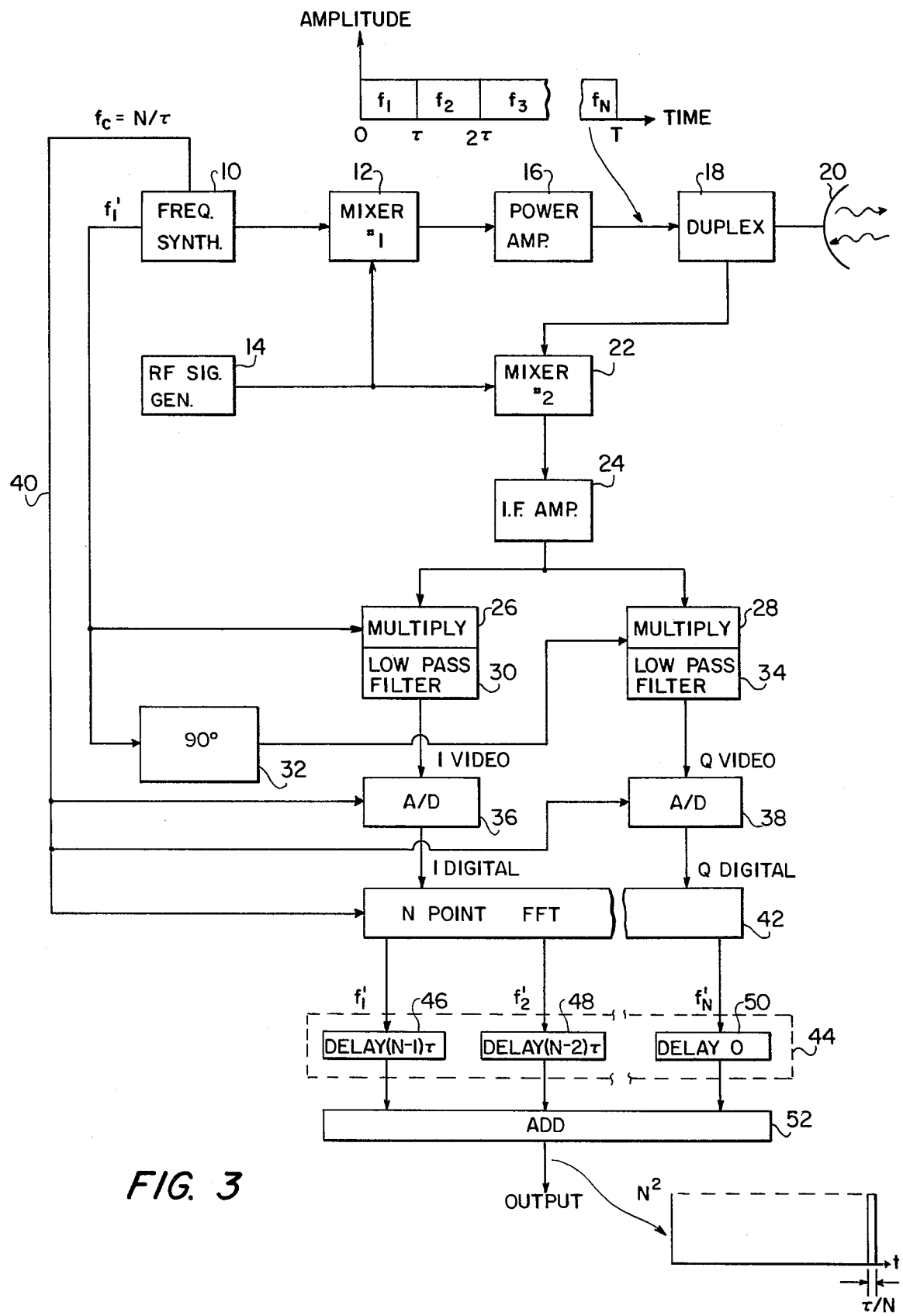
FIG. 3 is a detailed block diagram of an embodiment of the present invention.

The logic of the invention is shown in FIG. 3 for a compression of $N^2$ to 1. A frequency synthesizer 10 is shown which produces coherent intermediate frequency signals $f_1'$, $f_2'$, $f_3'$ ... $f_N'$ sequentially with each frequency lasting for a time interval $\tau = T/N$, where T is the total transmission time of the pulse and where $f_1' <$, $f_2'$ . . . $< f_N'$, and where $f_N' - f_{N-1}' = f_{N-1}' - f_{N-2}' = \ldots f_2' - f_1' = 1/\tau$. These sequential frequency steps are applied to a mixer 12 wherein they are mixed with a radio frequency (RF) carrier generated by an RF signal generator 14 in order to form the signals $f_N$, $f_{N-1}$, ... $f_1$ at the mixer 12 output. These resultant stepped signals are amplified in a power amplifier 16, and passed through a duplexer 18 for transmission via antenna 20.

Echoes received by the antenna 20 are passed through the duplexer 18 to a mixer 22 wherein they are mixed with the RF carrier output from the RF signal generator 14 to form the intermediate frequency IF frequency steps $f_1'$, $f_2'$ ... $f_N'$. This stepped IF signal output is then applied to an IF amplifier 24 for amplification.

In order to obtain the information at baseband, the IF echo signal from the amplifier 24 must be multiplied with a local oscillator intermediate frequency signal. However, because the intermediate frequency echo signal could have any phase at the time of reception by the receiver, proper processing requires the generation of I and Q video baseband signals in phase quadrature in order to obtain both amplitude and phase information. Accordingly, an I channel and a Q channel are provided for generating baseband signals. More particularly, the IF echo signal from the amplifier 24 is applied to a multiplier 26 in order to generate the I baseband signal making the sampled baseband signals equivalent to the Frank phase code. The local oscillator (LO) intermediate frequency signal should be the frequency $f_1'$. This $f_1'$ LO signal may be provided by frequency synthesizer 10 directly to the multiplier 26. The various products from this multiplication in the multiplier 26 are than filtered by the low pass filter 30.

Likewise, the IF echo signal from the amplifier 24 is also applied to the multiplier 28 in order to generate the Q baseband signal. The LO intermediate frequency signal applied to the multiplier 28 is the frequency $f_1'$ from the frequency sythesizer 10 shifted in phase by 90° by the phase shifter 32. The products from this multiplication of the $f_1'$ LO signal and the IF echo signal in the multiplier 28 are than filtered by the low pass filter 34 in order to yield the Q baseband signal.

It should be understood, that one of the major advantages to the use of this hybrid-type system is that it makes possible narrow band processing with the attendant elimination of out-of-band thermal noise. Accordingly, either the IF amplifier 24 or the low pass filters 30 and 34 or both should be narrow band circuits designed to pass only the band defined by the frequencies $f_1'$ through $f_N'$, i.e. pulses of length $\tau/N$. Thus, out-of-band thermal noise fold-over in the sampling process is eliminated.

The I and Q baseband signals from the low pass filters 30 and 34 are then applied to analog-to-digital converters 36 and 38, respectively, in order to prepare these signals for digital processing. The A/D converters 36 and 38 operate to sample the I and Q baseband signals with short pulses and then to digitize those sampled signals. The Nyquist frequency has been chosen as the sampling frequency for the A/D converters because it provides an acceptable sampling error rate and also provides a maximized mainlobe-to-sidelobe ratio. This rate is generally two times the reciprocal of the bandwidth, or in the case of I video and Q video baseband signals, it is equal to the reciprocal of the bandwidth itself. Thus, in this case, the short sampling pulses have interpulse sample periods of $\tau/N$ and are short with respect to $\tau/N$. This sampling frequency $F_c = N/\tau$ may conveniently be provided by the frequency synthesizer 10 to the A/D converters 36 and 38 via the line 40.

Figure 1:
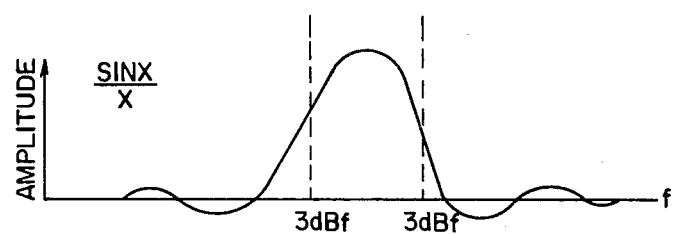
FIG. 1 is a graphical representation of the (sin x)/x response in a wideband Frank code system.

The digital I and Q baseband words are than applied to an N point Fast Fourier Transform (FFT) 42. In essence, the FFT 42 takes a series of $N^2$ successive complex words with each complex word formed by an I and Q signal pair, weights and processes these $N^2$ complex words, and generates N outputs therefrom representing the N passbands for the N transmitted frequency steps. Essentially, the Fast Fourier Transform circuit comprises an extremely efficient way of realizing a matched filter while allowing a significant reduction in the electronic hardward required for the implementation. The FFT circuit operates by weighting each of the complex digital words in accordance with the equation $$S(K) = \sum_{x=0}^{N-1} x(n)e^{-j2\pi nk/N}$$

where x(n) represents the nth sample in the set of samples 0 to N-1. The logic diagram for this FFT is shown in FIG. 1 of the Cantrell and Lewis U.S. Pat. No. 4,237,461 previously incorporated by reference. As noted at page 5 of that disclosure, k is the number of output signals being taken from the weighting means 20 shown in FIG. 1 of that patent. As noted in that figure, the FFT circuit may be implemented by the circuitry blocks 13, 20, and 64. A detailed discussion of the Fast Fourier Transform may be found in "Digital-Signal Processing" Oppenheim and Schafer, published in 1975 by Prentice-Hall, Inc., Englewood Cliffs, N.J. Various ways of implementing the weighting means are shown in particular in chapter 6, FIG. 6.10. This chapter and this figure are hereby incorporated by reference into this application.

The N output signals representing passbands for the N transmitted frequency steps are than applied to a differential delaying circuit 44 for delaying the N passband outputs such that the passband outputs occur simultaneously. More specifically, this differential delaying circuit 44 comprises a set of N delaying circuits, one for each frequency passband output. For example, the frequency output $f_1'$ from the FFT 42 is provided to a delay circuit 46 which provides a delay $(N-1)\tau$. The output frequency $f_2'$ is applied to a delay circuit 48 which provides a delay $(N-2)\tau$. Likewise, the frequency output $f_N'$ is applied to a delay circuit 50 which provides a delay of 0. In essence, the FFT 42 acts as a bank of frequency passband filters and the differentual delay circuit 44 acts to cause those passband signals to occur simultaneously if properly indexed in the FFT. The delayed passband signal outputs from the FFT 42 are applied to an adding circuit 52 whose output is the desired compressed pulse when the coded received signal is properly indexed in the adder. This compressed output pulse will have a pulse length of $T/N^2 = \tau/N$ and an amplitude of $N^2$ times the amplitude of the uncompressed echo.

Figure 4:
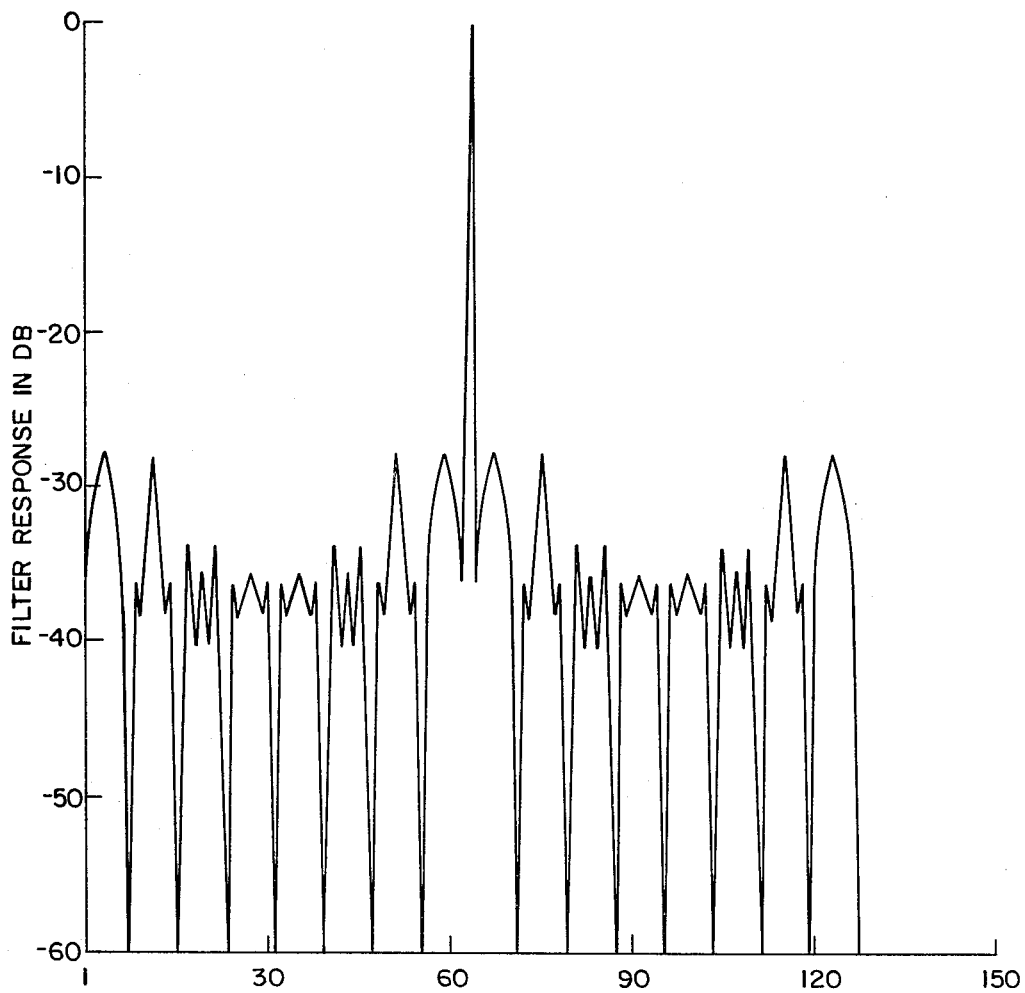
FIG. 4 is a graphical representation of a 64 element Frank code autocorrelation function.
Figure 5:
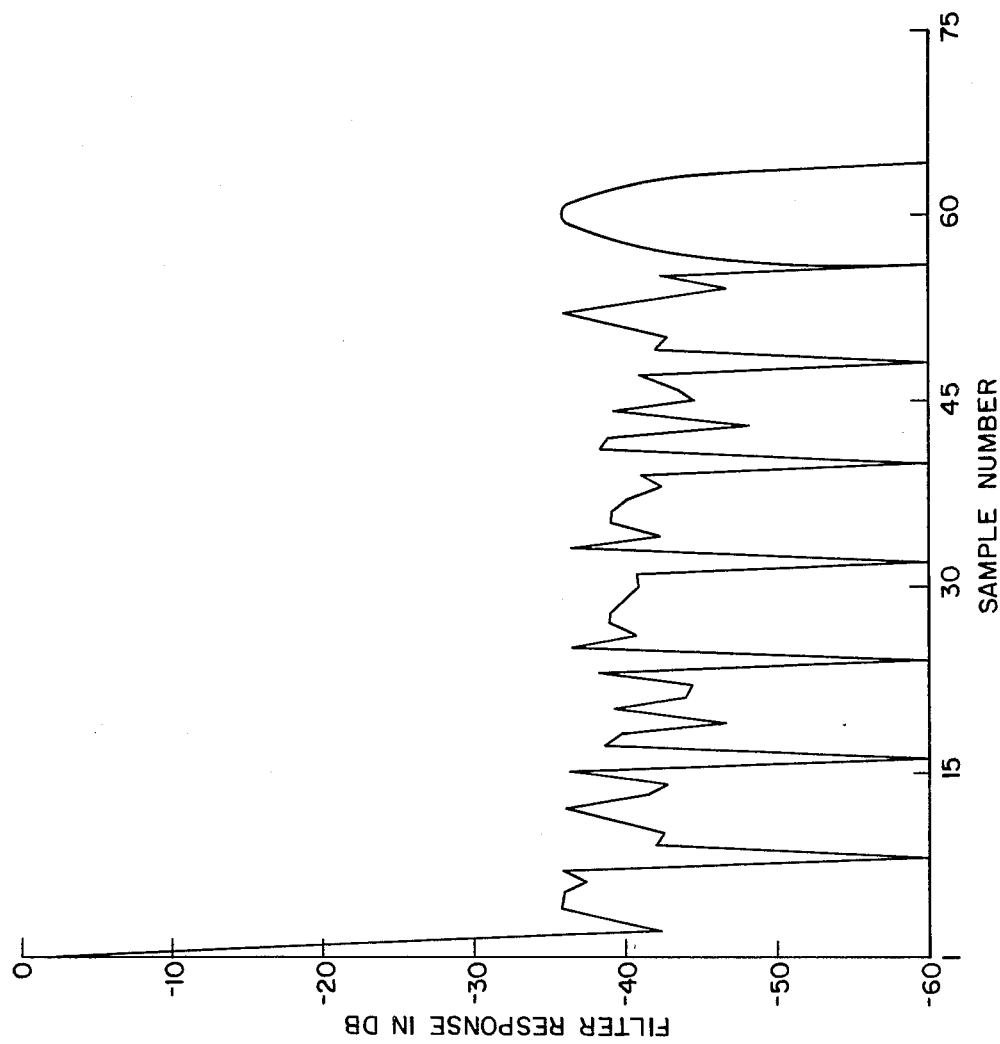
FIG. 5 is a graphical representation of a weighted 64—element Frank code autocorrelation function.

In this invention, it should be noted that the timing is critical. The clock rate of the A/D converters 36 and 38 and the FFT 42 must be $f_C = N/\tau = N^2/T$ in order to obtain the lowest possible sidelobes. With this clock rate, the sidelobe levels will be those of a Frank phase code which, when unweighted, are on the order of 28 dB maximum for a pulse compression ratio of 64 to 1 (N=8). This response is shown in FIG. 4. It should be emphasized that these 28 dB down sidelobes were obtained without amplitude weighting. Of course, these sidelobes can be further reduced by amplitude weighting the FFT 42 outputs with conventional weighting functions prior to addition, if desired. FIG. 5 illustrates the affect of weighting the FFT outputs.

It should be noted that the mainlobe to sidelobe ratio of this type of pulse compressor increases with the pulse compression ratio $N^2$. A 121 to 1 compression unweighted will result in highest sidelobes 31 dB down from the mainlobe. In general this ratio will be $\pi^2 N^2$.

The low sidelobes of this invention result from the optimum sampling of the received data. The length $\tau$ of the transmitted frequencies define the frequency resolution available as $\Delta f = 1/\tau$. This frequency resolution and the length T of the transmitted pulse define the maximum number of resolvable frequencies that can be employed as $T/\tau = N = B/\Delta f$. If more than N frequencies are employed, ambiguities result which increase the sidelobe levels. In addition, the lack of narrow band filters of width $\Delta f$ in the decoder of this invention eliminates the filter ring that permits the spectral lines of the desired pulse to exist long enough to repeat the compressed pulses as a grating lobe. This lack of narrow band filters limits the time in which sidelobes can be formed to the time the uncompressed pulse takes to travel through the decoder.

The ability to use a Fast Fourier Transform circuit in this system significantly reduces the hardware required to implement the matched filter. In particular, without the use of the FFT, i.e. an analog pipeline type processing, the system would require the use of $N^2$ complex multipliers in order to properly resolve the N frequencies. Since each one of these samples would require its own phase weight, and since digital phase weights require the use of a minimum of 4 multipliers, a subtractor, and 2 adders, such an implementation requires a significant investment in hardware. Accordingly, the reduction of the number of complex multipliers from $N^2$ to $N \log_2 N$ significantly reduces the hardware required.

To summarize the forgoing, the present invention is based on the discovery that the spectrum of step approximation to linear FM, after conversion to I and Q baseband and sampling at the Nyquist rate, is approximately identical to the sampled I and Q signals of a Frank code transmission. Thus, the sampled I and Q signals from the step approximation to linear FM signal can be compressed in the same manner as the Frank code, i.e. by using a Fast Fourier Transform circuit. Therefore, the present invention resides in the formation of a hybrid type system wherein an analog step approximation to linear FM pulse is transmitted, and then received utilizing narrow band equipment, and then digitized and applied to a Fast Fourier Transform circuit for the generation of the passband signals. This hybrid system has the advantage of providing very low sidelobes, simplicity of circuitry, low cost of instrumentation, and the ability to use a receiver bandwidth equal to reciprocal of the compressed pulse length along with the optimum sampling rate $f_C$. This simplicity of circuitry and low cost on instrumentation allows the use of arbitrarily large pulse compression ratios thus increasing target resolution.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of processing for use in a pulse-compression system which will yield low sidelobes comprising the steps of:
   generating a step-approximation to linear FM signal with N frequency steps;
   transmitting said signal;
   receiving echos from said transmitted signal;
   converting said received echos to baseband signals including the step of narrow band filtering said signal;
   digitizing said baseband signals at the Nyquist sampling rate for the baseband;
   Fast Fourier Transforming a set of $N^2$ of said digitized samples and generating N outputs therefrom representing the passbands for the N transmitted frequency steps;
   differentially delaying said N passband outputs such that the passband outputs occur simultaneously; and
   adding said N differentially delayed outputs to form a single short pulse of a desired length, such that when an echo signal is properly indexed within said set of $N^2$ digitized samples, then the resultant pulse has a peak amplitude.

2. A method as defined in claim 1, wherein said converting step is further comprised of the step of converting each echo signal to I and Q baseband signals; and wherein said digitizing step comprises the step of individually digitizing both said I and said Q baseband signals; and wherein said Fast Fourier Transforming step comprises the step of Fast Fourier Transforming a set of N I and Q complex signal words and generating N passband outputs therefrom.

3. A pulse compression system which will yield low sidelobes comprising:
   means for generating a step-approximation to linear FM signal with N frequency steps;
   means for transmitting said signal;
   means for receiving echos from said transmitted signal;
   means for converting said received echo signal to a baseband signal and including means for narrow band filtering said signal;
   means for digitizing said baseband signal at the Nyquist sampling rate for the baseband;
   Fast Fourier Transform means for weighting a discrete set of $N^2$ digitized samples from said digitizing means and generating N outputs therefrom representing the passbands for the N transmitted frequency steps;
   means for differentially delaying said N passband outputs such that the N passband outputs occur simultaneously; and
   means for adding said differentially delayed outputs to form a single pulse, such that when an echo is properly indexed within a discrete set of $N^2$ digitized samples, then a short pulse will be generated with a peak amplitude.

4. A pulse compression system as defined in claim 3, wherein said converting means comprises means for converting said echo signal to I and Q baseband signals; and
   wherein said digitizing means comprises means for individually digitizing said I and Q baseband signals; and
   wherein said Fast Fourier Transform means comprises means for forming N individual sets of N I and Q complex signal words and generating N passband outputs therefrom.

5. A pulse compression system as defined in claim 4, wherein said differential delay means comprises a set of N differential delay elements, with a different delay element connected to each of the N passband outputs from said Fast Fourier Transform means, with the delay between adjacent delay elements being equal to the time interval in which a given frequency in said stepped signal is transmitted.

6. A pulse compression system as defined in claim 5, wherein
   said generating means includes means for generating an I.F. pulse which varies in N steps linearly from a frequency $f_1$ to a frequency $f_N$ with each step lasting for a time $\tau$, for applying the frequency $f_1$ and the frequency $f_1$ shifted in phase by 90° to said converting means, and for generating and applying a timing signal $fc = N/\tau$ to control the operation of said digitizing means and said Fast Fourier Transform means in accordance therewith; and wherein said means for converting said echo to I and Q baseband signals comprises means for converting the received echo from the transmitted signal to a stepped I.F. pulse, narrow band amplifying means for amplifying and narrow-band filtering said stepped I.F. pulse, first multiplier and low pass filter means for multiplying said stepped I.F. pulse with the frequency $f_1$ from said generating means and low pass filtering the product to obtain said I baseband signal, and second multiplier and low pass filter means for multiplying said stepped I.F. pulse with the frequency $f_1$ from said generating means shifted in phase by 90° and low pass filtering the product to obtain said Q baseband signal.

* * * * *